(12) United States Patent
Kapetanovic et al.

(10) Patent No.: US 11,235,819 B2
(45) Date of Patent: Feb. 1, 2022

(54) MULTI-PANEL SKIRT SYSTEM FOR CARGO ENCLOSURES

(71) Applicant: TRANSTEX LLC, Lebanon, IN (US)

(72) Inventors: Semir Kapetanovic, Simpsonville, SC (US); Nathan David See, Omaha, NE (US); Michael Lorenzo Henderson, Piedmont, SC (US)

(73) Assignee: TRANSTEX LLC, Lebanon, IN (US)

( * ) Notice: Subject to any disclaimer, the term of this patent is extended or adjusted under 35 U.S.C. 154(b) by 174 days.

(21) Appl. No.: 16/777,874

(22) Filed: Jan. 30, 2020

(65) Prior Publication Data

US 2020/0239088 A1 Jul. 30, 2020

Related U.S. Application Data

(60) Provisional application No. 62/798,807, filed on Jan. 30, 2019.

(51) Int. Cl.
*B62D 35/02* (2006.01)
*B62D 35/00* (2006.01)
*B62D 33/04* (2006.01)

(52) U.S. Cl.
CPC ............ *B62D 35/02* (2013.01); *B62D 33/04* (2013.01); *B62D 35/001* (2013.01)

(58) Field of Classification Search
CPC ....... B62D 35/02; B62D 33/04; B62D 35/001
See application file for complete search history.

(56) References Cited

U.S. PATENT DOCUMENTS

| 7,578,541 B2 | 8/2009 | Layfield |
| 7,992,923 B2 | 8/2011 | Dayton |
| 8,342,595 B2 | 1/2013 | Henderson et al. |
| 8,540,304 B2 | 9/2013 | Kint |

(Continued)

FOREIGN PATENT DOCUMENTS

| CA | 2715304 A1 * | 3/2011 | ............. B62D 35/02 |
| CA | 2910650 A1 * | 4/2016 | |

OTHER PUBLICATIONS

International Search Report (ISR) and Written Opinion (WO), received in Transtex LLC International patent application serial No. PCT/US2020/15977, dated May 26, 2020, 12 pages.

(Continued)

*Primary Examiner* — Lori L Lyjak
(74) *Attorney, Agent, or Firm* — Chad D Tillman; Tillman Wright, PLLC

(57) ABSTRACT

A preferred multi-panel skirt system for a cargo enclosure includes two pair of forward and aft skirt panels with each pair located on an opposite lateral sides of the enclosure. In each pair, the forward skirt panel extends along the bottom wall generally in the lengthwise direction between a leading edge and a trailing edge, which is located adjacent to and aligned with or positioned laterally inboard of a lateral side edge of the enclosure. An aft skirt panel extends along the bottom wall generally in the lengthwise direction between a leading edge and a trailing edge aft of the forward skirt panel, which trailing edge is located adjacent to and aligned with or positioned laterally inboard of the lateral side edge of the enclosure. The leading edge of the aft skirt panel is positioned laterally inboard of the trailing edge of the forward skirt panel.

20 Claims, 10 Drawing Sheets

(56) References Cited

U.S. PATENT DOCUMENTS

| | | | |
|---|---|---|---|
| 8,899,460 B2* | 12/2014 | Wojcicki | B25C 1/005 |
| | | | 227/126 |
| 9,045,176 B1* | 6/2015 | Henderson, II | B62D 35/001 |
| 9,409,610 B2 | 8/2016 | Baker | |
| 9,809,260 B2 | 11/2017 | Smith | |
| 10,053,163 B1 | 8/2018 | Del Gaizo | |
| 10,343,731 B2 | 7/2019 | Emery | |
| 2009/0189414 A1 | 7/2009 | Boivin et al. | |
| 2011/0204677 A1 | 8/2011 | Wood | |
| 2012/0032475 A1 | 2/2012 | Grandominico et al. | |
| 2012/0074728 A1 | 3/2012 | Senatro | |
| 2012/0319428 A1 | 12/2012 | Wood | |
| 2014/0252799 A1 | 9/2014 | Smith | |
| 2015/0061318 A1 | 3/2015 | Kibler et al. | |
| 2015/0197291 A1* | 7/2015 | Roush | B62D 35/001 |
| | | | 280/423.1 |
| 2015/0259014 A1 | 9/2015 | Baker et al. | |
| 2016/0096557 A1 | 4/2016 | Bassily et al. | |
| 2016/0121940 A1 | 5/2016 | Courtney et al. | |
| 2017/0066487 A1 | 3/2017 | Boivin et al. | |

OTHER PUBLICATIONS

"International Search Report" and "Written Opinion of the International Search Authority" (ISA/US) in Transtex, LLC, International Patent Application Serial No. PCT/US2020/015977, dated May 26, 2020 (11 pages).

* cited by examiner

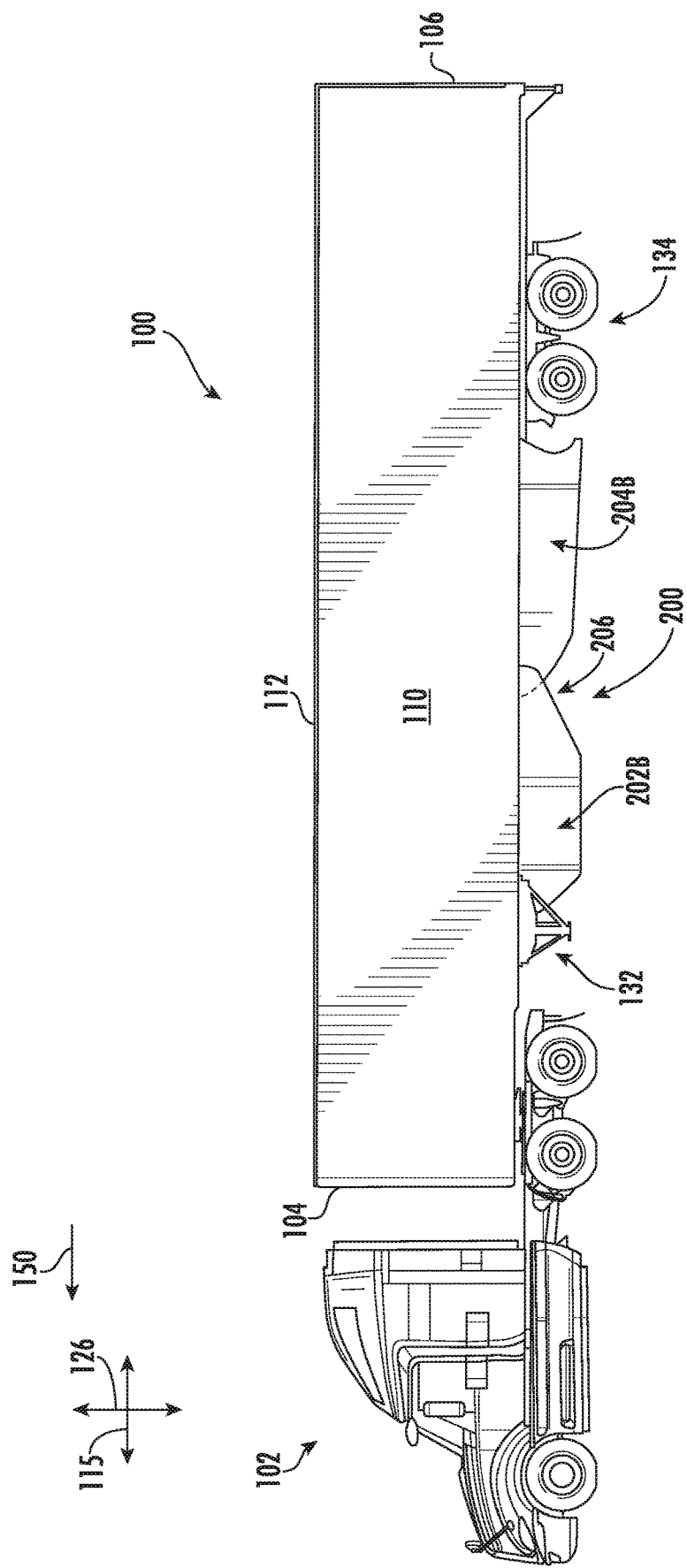

MULTI-PANEL SKIRT SYSTEM FOR CARGO ENCLOSURES

CROSS-REFERENCE TO RELATED APPLICATION

The present application is a U.S. nonprovisional patent application of, and claims priority under 35 U.S.C. § 119(e) to, U.S. provisional patent application 62/798,807, filed Jan. 30, 2019, which provisional patent application is incorporated by reference herein.

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to skirt systems and fairings for cargo enclosures.

An ongoing effort to reduce drag in vehicular structures and associated cargo enclosures is of great importance as fuel economy becomes an increasingly large consideration in the overall design of a vehicle or its associated cargo enclosure. As the drag increases, the amount of fuel needed to move the vehicle also increases due to the greater energy required to overcome the drag. For instance, it has been stated that for a vehicle traveling at 70 mph, about 65% of the total fuel consumption of the vehicle's engine is used to overcome drag. Therefore, even a small reduction in the drag experienced by a vehicle traveling at highway speeds can result in a significant improvement in fuel economy.

A typical drag-reducing technique for heavy-duty vehicles, such as tractor-trailers (also known as semi tractors, tractors, class 8 long haul trucks, transfer trucks, 18-wheelers, semis, etc.), is to install a skirt along each side of the undercarriage of the trailer. A conventional skirt comprises an elongated panel that is typically configured to extend continuously across the gap defined between a trailer's landing gear and rear wheels. The skirt is generally designed to substantially block an airflow from flowing underneath the trailer, thereby preventing high energy air from contacting the rear wheels and causing a significant amount of drag on the vehicle.

While conventional skirt designs do provide some drag-reducing advantages for a heavy-duty vehicle, such designs still have several drawbacks. For example, when a crossflow is directed across the trailer and flows between the skirts positioned along either side of the undercarriage at the front end of the trailer, the continuous profile of the opposed skirts traps the airflow therebetween. As a result, the trapped airflow is directed towards and into the rear wheels of the trailer, thereby resulting in an increase in the amount of drag on the trailer. Moreover, given the continuous profile of conventional skirts, such skirts are often subject to damage due to impacts with the adjacent travel surface or other impediments.

Accordingly, a need exists for an improved skirt design and related skirt system to provide drag reduction for a cargo enclosure that is included within or configured to be coupled to or hauled by a vehicle.

SUMMARY OF THE INVENTION

The invention includes many aspects and features. Moreover, while many aspects and features relate to, and are described in, the context of tractor-trailers and cargo enclosures related thereto, the invention is not limited to use only in such context, as will become apparent from the following summaries and detailed descriptions of aspects, features, and one or more embodiments of the invention.

Accordingly, in one aspect a cargo enclosure for storing cargo includes a multi-panel skirt system installed relative to a bottom wall of the cargo enclosure. The multi-panel skirt system is generally configured to reduce the overall amount of drag occurring on the cargo enclosure.

In another aspect, a cargo enclosure for storing cargo comprises: (a) a top wall; (b) front and rear walls; (c) first and second side walls extending between the front and rear walls in a lengthwise direction of the cargo enclosure; (d) a bottom wall extending between the front and rear walls in the lengthwise direction and between the first and second side walls in a lateral direction of the cargo enclosure, the first side wall intersecting the bottom wall at a first lateral side edge of the cargo enclosure, the second side wall intersecting the bottom wall at a second lateral side edge of the cargo enclosure, with the top wall, the front and rear walls, the side walls, and the bottom wall enclosing a cargo space of the cargo enclosure; and (e) a multi-panel skirt system installed or otherwise secured to the bottom wall. The multi-panel skirt system comprises: a first forward skirt panel extending along the bottom wall generally in the lengthwise direction between a leading edge and a trailing edge, the trailing edge of the first forward skirt panel being located adjacent to and aligned with or positioned laterally inboard of the first lateral side edge of the cargo enclosure; and a first aft skirt panel extending along the bottom wall generally in the lengthwise direction between a leading edge and a trailing edge aft of the first forward skirt panel relative to a forward travel direction of the cargo enclosure, the trailing edge of the first aft skirt panel being located adjacent to and aligned with or positioned laterally inboard of the first lateral side edge of the cargo enclosure. The first aft skirt panel extends laterally inboard as the first aft skirt panel extends in the lengthwise direction from its trailing edge to its leading edge such that the leading edge of the first aft skirt panel is positioned laterally inboard of the trailing edge of the first forward skirt panel.

In a feature, the leading edge of the first forward skirt panel is positioned further laterally inboard than the trailing edge of the first forward skirt panel. The cargo enclosure preferably defines a lengthwise centerline extending in the lengthwise direction that is centered relative to the first and second lateral side edges in the lateral direction, and the leading edge of the first forward skirt panel is positioned a lateral distance from the lengthwise centerline that is less than a lateral distance defined between the leading edge of first forward skirt panel and the first lateral side edge of the cargo enclosure.

In a feature, the trailing edge of the first forward skirt panel is positioned forward of the leading edge of the first aft skirt panel relative to the forward travel direction for the cargo enclosure such that a lengthwise gap is defined between the first forward and aft skirt panels in the lengthwise direction.

In a feature, the trailing edge of the first forward skirt panel is positioned aft of the leading edge of the first aft skirt panel relative to the forward travel direction for the cargo enclosure such that the first aft skirt panel overlaps the first forward skirt panel in the lengthwise direction, and a transverse gap, extending between the trailing edge of the first forward skirt panel and the leading edge of the first aft skirt panel, defines an air vent.

In a feature, the first forward skirt panel defines a compound lateral profile between its leading and trailing edges. The first forward skirt panel preferably includes a first lengthwise section and a second lengthwise section, a lateral profile of the first lengthwise section differing from a lateral profile of the second lengthwise section such that the first forward skirt panel extends further inboard along the second lengthwise section than along the first lengthwise section. The cargo enclosure also preferably includes landing gear installed or otherwise secured to the bottom wall and the first forward skirt panel defines a transition point at which the lateral profile of the first lengthwise section transitions to the lateral profile of the second lengthwise section, the first forward skirt panel being installed relative to the landing gear such that the transition point is located adjacent to an aft end of the landing gear.

In a feature, the first aft skirt panel defines a compound lateral profile between its leading and trailing edges.

In a feature, the first aft skirt panel includes a first lengthwise section and a second lengthwise section, a lateral profile of the first lengthwise section differing from a lateral profile of the second lengthwise section such that the first aft skirt panel extends further inboard along the second lengthwise section than along the first lengthwise section.

In a feature, each of the first forward and aft skirt panels defines a compound lateral profile between its leading and trailing edges.

In another aspect, a multi-panel skirt system for a cargo enclosure comprises: (a) a first forward skirt panel configured to extend along a bottom wall of the cargo enclosure generally in the lengthwise direction of the cargo enclosure between a leading edge and a trailing edge of the first forward skirt panel, with the trailing edge of the first forward skirt panel located adjacent to and aligned with or positioned laterally inboard of a first lateral side edge of the cargo enclosure; and (b) a first aft skirt panel configured to extend along the bottom wall aft of the first forward skirt panel generally in the lengthwise direction between a leading edge and a trailing edge of the first aft skirt panel relative to a forward travel direction of the cargo enclosure, with the trailing edge of the first aft skirt panel being located adjacent to and aligned with or positioned laterally inboard of the first lateral side edge of the cargo enclosure. The first aft skirt panel is configured to extend laterally inboard as the first aft skirt panel extends in the lengthwise direction from its trailing edge to its leading edge such that the leading edge of the first aft skirt panel is positioned laterally inboard of the trailing edge of the first forward skirt panel.

In a feature, the leading edge of the first forward skirt panel is configured to be positioned further laterally inboard than the trailing edge of the first forward skirt panel.

In a feature, the multi-panel skirt system further comprises a second forward skirt panel and a second aft skirt panel, the second forward skirt panel configured to extend along the bottom wall in the lengthwise direction between a leading edge and a trailing edge thereof, the second aft skirt panel configured to extend along the bottom wall in the lengthwise direction between a leading edge and a trailing edge thereof aft of the second forward skirt panel relative to the forward travel direction of the cargo enclosure.

In a feature, the multi-panel skirt system further comprises a second forward skirt panel and a second aft skirt panel, the second forward skirt panel extending in the lengthwise direction between a leading edge and a trailing edge and being installed along the bottom wall, the second aft skirt panel extending in the lengthwise direction between a leading edge and a trailing edge and being installed along the bottom wall aft of the second forward skirt panel relative to the forward travel direction of the cargo enclosure.

In a feature, the multi-panel skirt system is configured to define a lateral gap between the first and second forward skirt panels in the lateral direction of the cargo enclosure.

In a feature, the first and second forward skirt panels are configured to create a converging lateral gap therebetween as the first and second forward skirt panels extend in the forward travel direction towards their respective leading edges.

The first forward skirt panel may serves as an upwind forward panel and the second forward skirt panel serves as a downwind forward panel when the cargo enclosure is subjected to a cross-flow directed from its first lateral side edge towards its second lateral side edge, and when the cross-flow is directed through the lateral gap defined between the first and second forward skirt panels at their leading edges, the leading edge of the upwind forward panel is configured to generate a vortex in association with a first portion of the cross-flow directed through the lateral gap while a second portion of the cross-flow is configured to be captured along an inner surface of the downwind forward panel. Furthermore, the second portion of the cross-flow preferably exits from underneath the cargo enclosure via an air vent defined between the downwind forward panel and the second aft skirt panel.

In a feature, the trailing edge of the second forward skirt panel is configured to be spaced apart from the leading edge of the second aft skirt panel such that an air vent is defined between the second forward and aft skirt panels.

In a feature, the multi-panel skit system consists of two pairs of skirt panels, each pair consisting of a forward skirt panel and an aft skirt panel.

In a feature, each panel skirt is configured to create vortexes at its leading edge from a cross-wind passing thereby.

In a feature, each skirt panel comprises means for generating a vortex when an airflow is directed past the leading edge thereof. The means may comprise a sharp inboard lateral profile of a leading section of the skirt panel; the means may comprise a camber or shape of a leading section of the skirt panel; or the means may comprise both a sharp inboard lateral profile of a leading section of the skirt panel, and a camber or shape of a leading section of the skirt panel.

In another aspect, a kit includes a multi-panel skirt system for installation on a cargo enclosure in accordance with one or more preferred embodiments of the invention.

In another aspect, a method includes installing a multi-panel skirt system on a cargo enclosure in accordance with one or more preferred embodiments of the invention.

In another aspect, the multi-panel skirt system comprises a first forward skirt panel and a first aft skirt panel. The first forward skirt panel extends in the lengthwise direction between a leading edge and a trailing edge and is installed along the bottom wall. The trailing edge of the first forward skirt panel is located adjacent to and is aligned with or positioned laterally inboard of the first lateral side edge of the cargo enclosure. The first aft skirt panel extends in the lengthwise direction between a leading edge and a trailing edge and is installed along the bottom wall aft of the first forward skirt panel relative to a forward travel direction of the cargo enclosure. The trailing edge of the first aft skirt panel is located adjacent to and is aligned with or positioned laterally inboard of the first lateral side edge of the cargo enclosure. The first aft skirt panel preferably defines a profile that extends laterally inboard as the first aft skirt panel extends in the lengthwise direction from its trailing edge to its leading edge such that the leading edge of the first aft skirt panel is positioned laterally inboard of the trailing edge of the first forward skirt panel.

In another aspect, a multi-panel skirt system includes pairs of forward and aft skirt panels supported relative to a bottom wall of the cargo enclosure. Specifically, first forward and aft skirt panels are installed on the bottom wall on a first lateral side of the enclosure and second forward and aft skirt panels are installed on the bottom wall on a second lateral side of the enclosure.

In another aspect, a multi-panel skirt system for a cargo enclosure comprises one or more skirt panels configured in accordance with one or more of the skirt panel embodiments described herein.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 12 illustrates a full side view of the cargo enclosure shown in FIG. 11, particularly illustrating an example of a side profile for the embodiment of the skirt panels shown in FIG. 11.

DETAILED DESCRIPTION OF THE INVENTION

Figure 1:
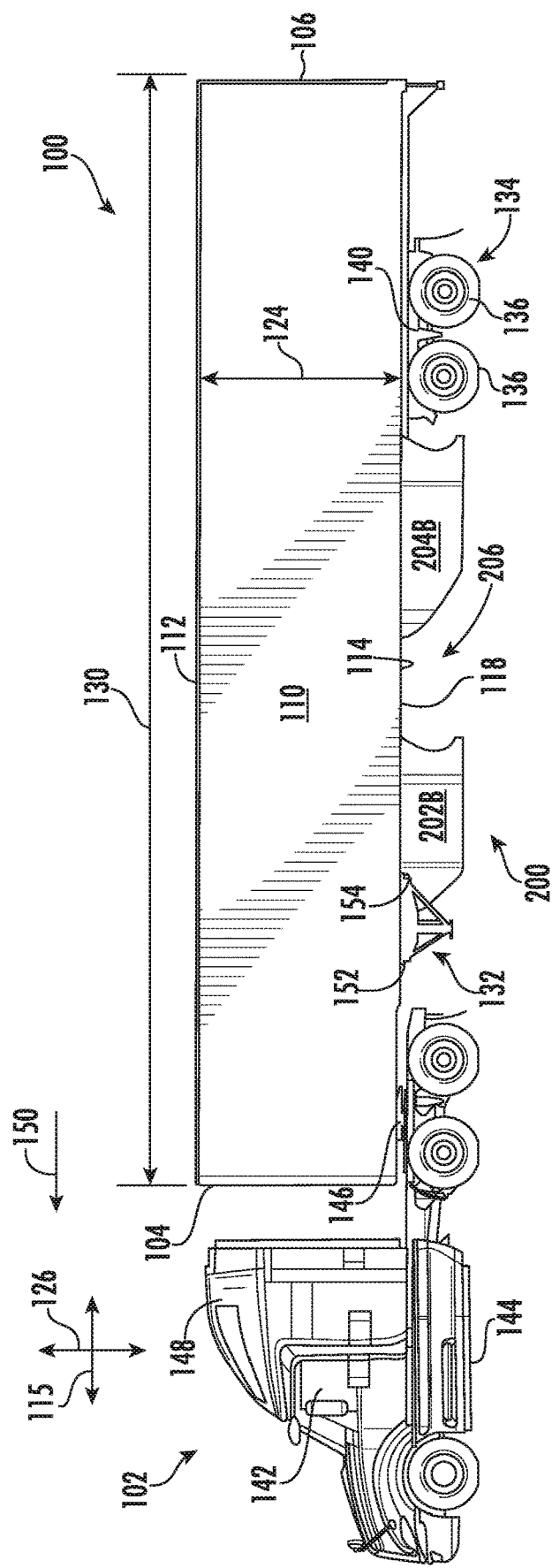
FIG. 1 illustrates a side view of one embodiment of a cargo enclosure configured in accordance with a preferred embodiment of one or more aspects and features of the invention, particularly illustrating the cargo enclosure coupled to a tractor and including various skirt panels of one embodiment of a multi-panel skirt system installed relative to a bottom side of the enclosure.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Reference now will be made in detail to embodiments of the invention, one or more examples of which are illustrated in the drawings. Each example is provided by way of explanation of the invention, not limitation of the invention. In fact, it will be apparent to the Ordinary Artisan that various modifications and variations can be made in the invention without departing from the scope or spirit of the invention. For instance, features illustrated or described as part of one embodiment can be used with another embodiment to yield a still further embodiment. Thus, it is intended that the invention covers such modifications and variations as come within the scope of the appended claims and their equivalents.

A multi-panel skirt system as seen in the drawings includes a plurality of skirt panels configured to be installed along a bottom side or wall of a cargo enclosure to reduce the amount of drag on the enclosure as it is being hauled or transported. Specifically, in several embodiments, the multi-panel skirt system preferably includes both a forward skirt panel and an aft skirt panel installed underneath the cargo enclosure on each of its opposed lateral sides. Each panel extends lengthwise between a leading edge and a trailing edge and defines an aerodynamic shape between its leading and trailing edges. For instance, in several embodiments, each panel preferably defines a compound or complex curvature or shape between its leading and trailing edges so as to optimize the aerodynamic performance and drag-reducing properties of the panel. Specifically, in one embodiment, the trailing edge of each panel preferably is positioned at or adjacent to its corresponding lateral side edge of the cargo enclosure, with the panel being curved or angled inwardly as it extends forward towards its leading edge such that the leading edge is spaced inwardly from the adjacent lateral side. In such an embodiment, in addition to providing the ability to block wind from flowing underneath the cargo enclosure along the lengths of the panels, each panel preferably is adapted to create a volume of low energy air underneath the cargo enclosure to reduce the overall amount of drag on the rear wheels. For example, the panel shapes preferably enable the panels positioned along the upwind side of the enclosure (as defined by the direction of the wind) to create a vortex at the leading edges of such panels, which produces a lower pressure area underneath the cargo enclosure and also reduces the amount of drag on the panel itself. In addition, the shape of the panels preferably also allows the panels positioned along the downwind side of the enclosure (as defined by the direction of the wind) to capture the flow of air underneath the cargo enclosure along the inner surfaces of such panels and divert such airflow outwardly from underneath the enclosure and away from the rear wheels.

Additionally, in combination with the shape of each panel, the relative positioning of the forward and aft skirt panels along each lateral side of the cargo enclosure preferably is selected to allow the air flowing along the inner sides of the downwind panels to be expelled from underneath the cargo enclosure. For example, the forward and aft panels installed relative to each lateral side of the cargo enclosure preferably is mounted relative to each other such that a gap or air vent is defined between the trailing edge of the forward panel and the leading edge of the aft panel. In such an embodiment, due to the curvature of the panels, the leading edge of the aft panel will be positioned further inboard from the adjacent lateral side of the cargo enclosure than the trailing edge of the forward panel. As a result, when an airflow is guided along the inner surface of the downwind forward panel, the airflow preferably is expelled from underneath the cargo enclosure via the air vent defined between the adjacent panels.

Figure 2:
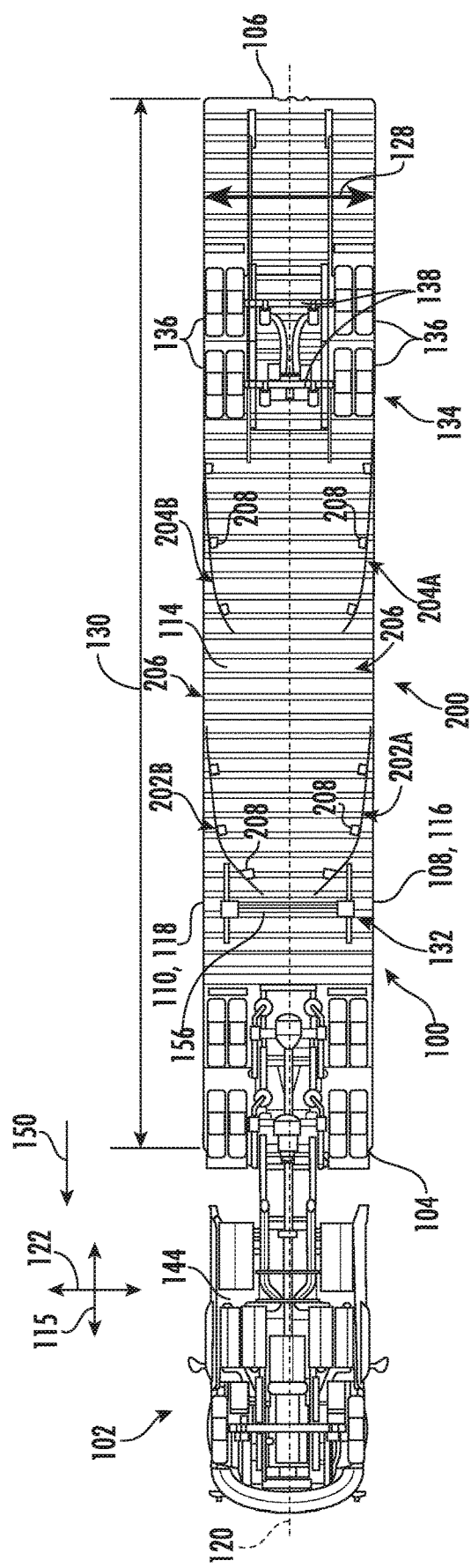
FIG. 2 illustrates a bottom view of the cargo enclosure and tractor shown in FIG. 1, particularly illustrating the relative positioning of the various skirt panels along the bottom side of the cargo enclosure.
Figure 3:
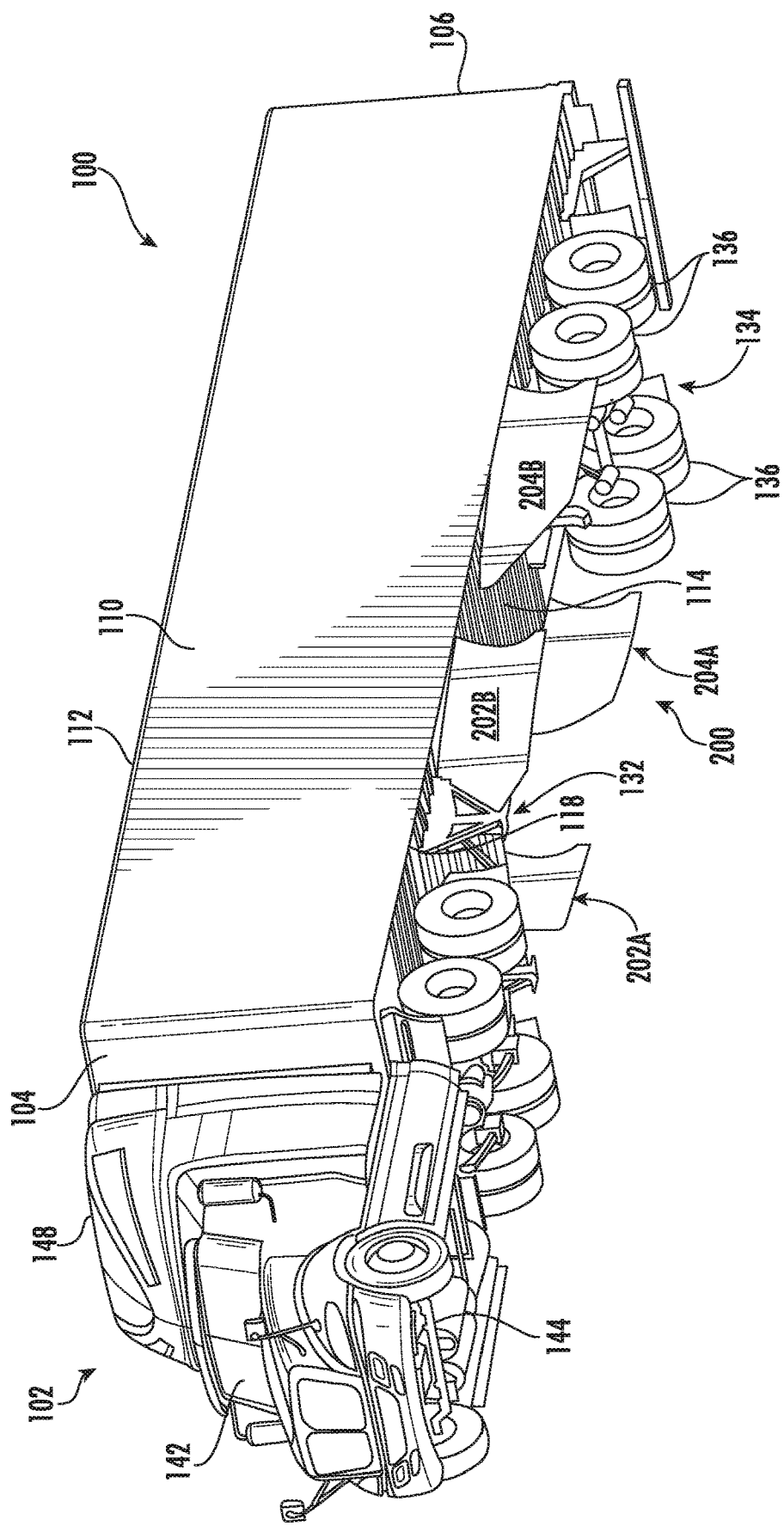
FIG. 3 illustrates a front, bottom perspective view of the cargo enclosure shown in FIGS. 1 and 2, particularly illustrating another view of the relative positioning of the various skirt panels along the bottom side of the cargo enclosure.
Figure 4:
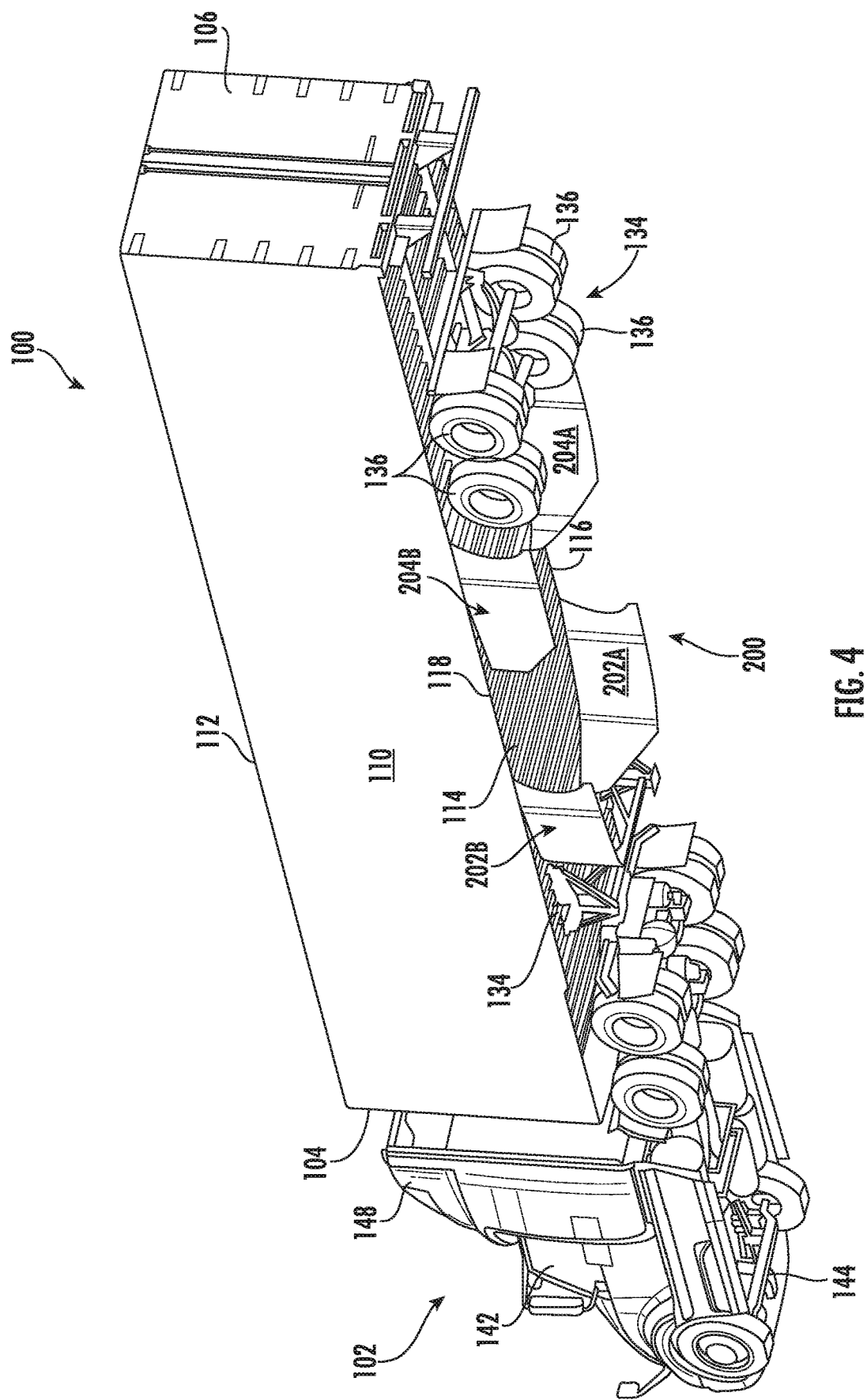
FIG. 4 illustrates a rear, bottom perspective view of the cargo enclosure shown in FIGS. 1 and 2, particularly illustrating another view of the relative positioning of the various skirt panels along the bottom side of the cargo enclosure.

Referring now to FIGS. 1-4, several views of an example of a cargo enclosure 100 onto which one embodiment of a multi-panel skirt system 200 has been installed is illustrated in accordance with a preferred embodiment of one or more aspects and features of the invention. Specifically, FIGS. 1 and 2 illustrate side and bottom views, respectively, of the cargo enclosure 100 coupled to a tractor 102 in accordance with a preferred embodiment of one or more aspects and features of the invention. Additionally, FIGS. 3 and 4 illustrate respective front and rear, bottom perspective views of the cargo enclosure 100 shown in FIGS. 1 and 2.

In several embodiments, the cargo enclosure 100 preferably generally defines an enclosed space or volume for storing cargo. For example, as shown in FIGS. 1-4, the cargo enclosure 100 may, in one embodiment, define a rectangular storage or cargo space bounded along its sides by a front wall 104, a rear wall 106 and a plurality of additional enclosure walls 108, 110, 112, 114 extending between the front and rear walls 104, 106 in a lengthwise direction 115 of the cargo enclosure 100. For instance, in one embodiment, the cargo enclosure can include opposed side walls (e.g., a first side wall 108 and a second side wall 110), a top wall 112, and a bottom wall 114 extending between the front and rear walls 104, 106 in the lengthwise direction 115. As is generally understood, the top wall 112 can define the top or roof of the enclosed space and the bottom wall 114 can define the bottom or floor of the enclosed space. Similarly, the side walls 108, 110 can generally define the opposed lateral sides of the enclosed space. It should be appreciated that, in other embodiments, the various enclosure walls 104, 106, 108, 110, 112, 114 of the cargo enclosure 100 can be configured in any other manner such that the enclosure 100 defines a storage space having any other suitable shape.

As particularly shown in FIGS. 2-4, the cargo enclosure 100 can define lateral side edges 116, 118 extending in the lengthwise direction 115 of the enclosure 100 at the intersections between the bottom wall 114 and the opposed side walls 108, 110. Specifically, the cargo enclosure 100 can define a first lateral side edge 116 at the intersection between the bottom wall 114 and the first side wall 108, and a second lateral side edge 118 at the intersection between the bottom wall 114 and the second side wall 110. Each lateral side edge 116, 118 can generally extend in the lengthwise direction 115 between the front and rear walls 104, 106 of the cargo enclosure 100.

As particularly shown in FIG. 2, the opposed side walls 108, 110 of the cargo enclosure 100 (and, thus, the corresponding lateral side edges 116, 118) are spaced apart from a lengthwise centerline 120 of the cargo enclosure 100 in a lateral direction 122 of the enclosure 100. In this regard, for purposes of the disclosure provided herein and without intent to limit, the terms "laterally inboard" or simply "inboard" and "laterally outboard" or simply "outboard" will be used to describe the positioning or orientation of components or features relative to the lengthwise centerline 120 or the opposed side walls/edges 108, 110, 116, 118 of the cargo enclosure 100. Specifically, a feature(s) that is located closer to the lengthwise centerline 120 than the opposed side wall/edges 108, 110, 116, 118 in the lateral direction 122 shall be considered to be positioned inboard of a feature(s) that is located closer to the opposed side wall/edges 108, 110, 116, 118 than the lengthwise centerline 120 in the lateral direction 120. Similarly, a feature(s) that is located closer to the opposed side wall/edges 108, 110, 116, 118 than the lengthwise centerline 120 in the lateral direction 122 shall be considered to be positioned outboard of a feature(s) that is located closer to the lengthwise centerline 120 than the opposed side wall/edges 108, 110, 116, 118 in the lateral direction 122.

It should be appreciated that the cargo enclosure 100 can generally define any suitable dimensions. For example, as shown in FIG. 1, the cargo enclosure 100 can define a height 124 in a heightwise direction 126 of the cargo enclosure 100 between the top wall 112 and the bottom wall 114 of the enclosure 100. In addition, as shown in FIG. 2, the cargo enclosure 100 can define a lateral width 128 in the lateral direction 122 of the cargo enclosure 100 between the opposed side walls 108, 110 of the enclosure 100 and a length 130 in the lengthwise direction 115 between the front wall 104 and the rear wall 106 of the enclosure 100.

Moreover, as shown in FIGS. 1-4, the cargo enclosure 100 may, in several embodiments, form part of a trailer configured for use as a tractor-trailer combination. In such embodiments, the cargo enclosure 100 can include or be associated with any suitable trailer-related components, such as landing gear 132, a rear wheel assembly 134, or the like. As shown, the rear wheel assembly 134 can include, for example, rear wheels 136, axles 138, and a suspension system 140. Additionally, when used in a tractor-trailer combination, the cargo enclosure 100 can be configured to be coupled to or hauled by a tractor 102 having any suitable tractor configuration. For example, as shown in the illustrated embodiment, the tractor 102 can include a cab 142 supported on a chassis 144 and a fifth wheel coupling 146 extending behind the cab 142 for coupling the tractor 102 to the cargo enclosure 100. Additionally, as particularly shown in FIG. 1, the tractor 102 can include an air dam 148 mounted on top of the cab 142.

It should be appreciated that, in other embodiments, the cargo enclosure 100 can correspond to or form part of any other suitable transport vehicle or transport or storage system. For example, the cargo enclosure 100 can correspond to or form part of the rear storage enclosure of a straight or box truck. In another embodiment, the cargo enclosure 100 can correspond to or form part of a railway car or boxcar, a motorhome, bus, cab-over-type vehicle or any other suitable movable storage compartment or space, regardless of whether the compartment or space is pulled, pushed or self-propelled.

As indicated above, in accordance with a preferred embodiment of one or more aspects and features of the invention, a multi-panel skirt system 200 can be installed along the bottom wall 114 of the cargo enclosure 100 relative to the opposed lateral side edges 116, 118 of the enclosure 100. Specifically, in several embodiments, the multi-panel skirt system 200 can include a pair of forward skirt panels and a pair of aft skirt panels installed between the landing gear 132 and the rear wheel assembly 134 of the cargo enclosure 100, with the forward skirt panels being installed underneath the cargo enclosure 100 forward of the aft skirt panels in the lengthwise direction 115 relative to the forward direction of travel for the enclosure 100 (e.g., as indicated by arrow 150 in FIGS. 1 and 2). For example, as shown, first forward and aft skirt panels 202A, 204A are installed along the bottom wall 114 of the cargo enclosure 100 on a first lateral side. Similarly, second forward and aft skirt panels 202B, 204B are installed along the bottom wall 114 of the cargo enclosure 100 on the opposite lateral side.

The disclosed skirt panels can generally be configured to substantially block air from flowing underneath the enclosure 100, thereby creating a pocket of low energy air along the undercarriage that reduces the overall amount of drag on the cargo enclosure 100, particularly on the rear wheel assembly 134. Additionally, each individual panel can be shaped or otherwise aerodynamically configured so as to produce a vortex at its leading edge that creates a low pressure area adjacent to the panel, thereby reducing the resulting drag on the panel itself. Moreover, the relative positioning of the panels can allow for any airflow that is actually directed underneath the enclosure 100 to be expelled therefrom. For example, as shown in the illustrated embodiment, each forward skirt panel can be installed relative to its adjacent aft skirt panel along the bottom wall 114 of the cargo enclosure 100 such that a gap or air vent 206 is defined between each respective pair of forward and aft panels. As a result, an airflow captured underneath the cargo enclosure 100 by the forward skirt panel positioned along the downwind side of the enclosure 100 can be expelled through the air vent 206 defined between such forward panel and its respective aft skirt panel as opposed to being directed downstream towards the rear wheel assembly 134.

In addition to providing a channel for expelling air from underneath the cargo enclosure 100, the air vents or gaps 206 defined between the forward and aft panels can also provide areas of increased vertical clearance underneath the enclosure 100 relative to the adjacent travel surface. Thus, as compared to conventional skirt designs that extend continuously between the landing gear 132 and the rear wheels 136, the skirt panels of the disclosed system 200 can have a reduced likelihood of contact with the adjacent travel surface or other impediments. In addition, the air vents or gaps 206 can also provide a convenient pathway for accessing the undercarriage of the cargo enclosure 100 (e.g., for service personnel or for the driver).

It should also be appreciated that the various skirt panels disclosed herein can generally be configured to be supported relative to the bottom wall 114 of the cargo enclosure 100 using any suitable bracket assembly or other mounting configuration. For example, as schematically shown in FIG. 2, one or more rigid or resilient mounting brackets 208 can be coupled between the bottom wall 114 and each panel to mount the panel to the cargo enclosure 100. In such an embodiment, the specific configuration of the mounting brackets 208 can generally very depending on the desired mounting configuration. However, the Ordinary Artisan will appreciate that various different bracket arrangements are commercially available that can be used in mounting the disclosed skirt panels to the underside of a cargo enclosure.

Figure 5:
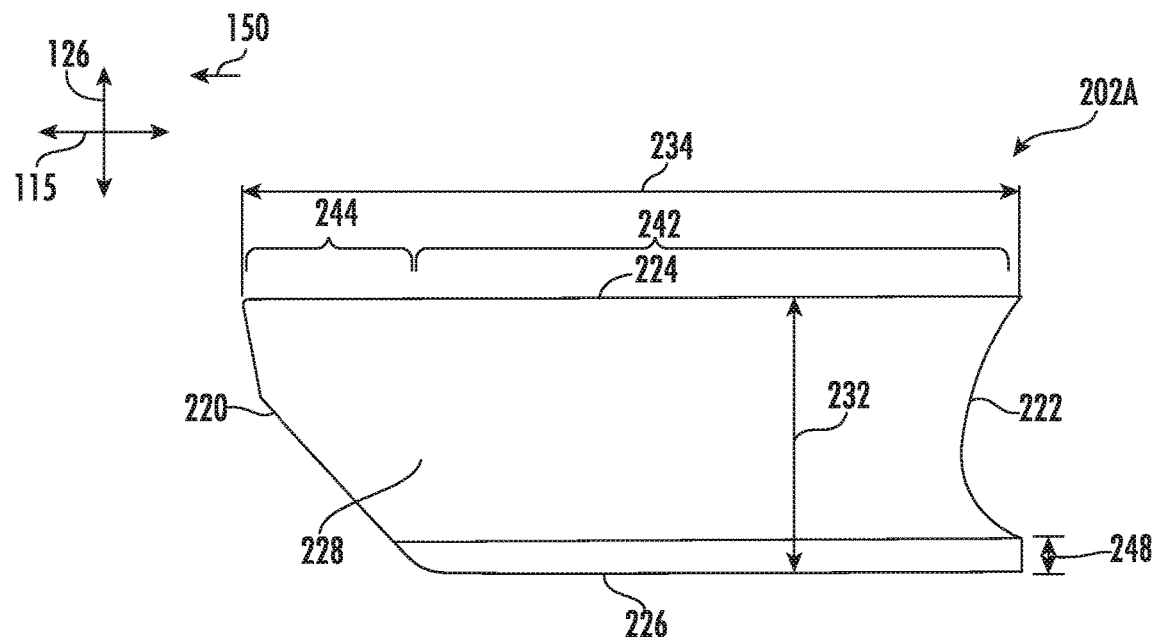
FIGS. 5 and 6 illustrate respective side and bottom views of one of the forward skirt panels of the multi-panel skirt system shown in FIGS. 1-4.
Figure 6:
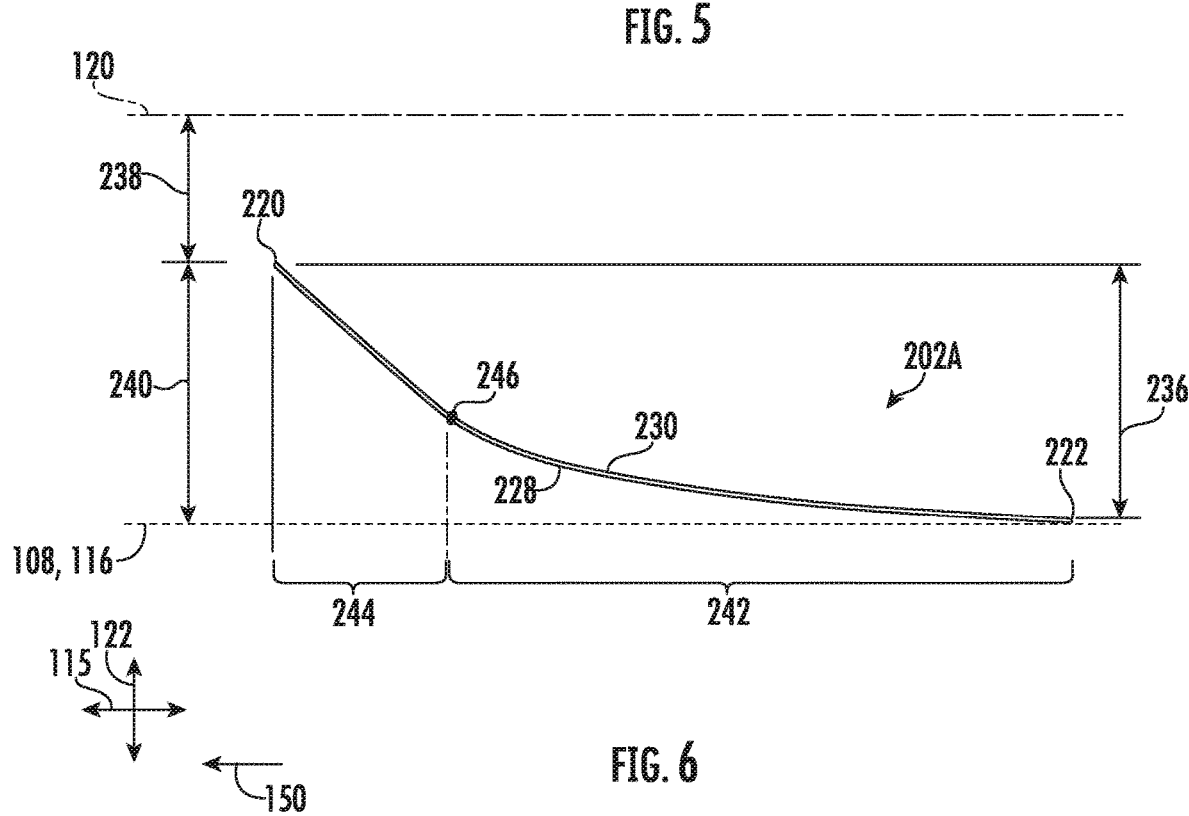

Referring now to FIGS. 5 and 6, differing views of one of the forward skirt panels described above are illustrated in accordance with a preferred embodiment of one or more aspects and features of the invention. Specifically, FIGS. 5 and 6 illustrate respective side and bottom views of the first forward skirt panel 202A shown in FIGS. 1-4, with FIG. 6 depicting first and second dashed reference lines to indicate the locations of the lengthwise centerline 120 and the adjacent side wall/edge 108, 116 of the cargo enclosure 100 relative to the forward skirt panel 202A when the panel 202A is in its installed state. It should be appreciated that the second forward panel 202B can be configured to mirror the first forward panel 202A and can have the same relative positioning to its adjacent side wall/edge 110, 118 of the cargo enclosure 100 as that shown in FIG. 6.

As shown, the forward skirt panel 202A can generally be configured to extend in the lengthwise direction 115 between a leading edge 220 and a trailing edge 222, and in the heightwise direction 126 between a top end 224 and a bottom end 226. The forward skirt panel 202A can also define a laterally outer side or surface 228 and a laterally inner side or surface 230, with the outer surface 228 generally facing outboard in the lateral direction 122 (i.e., in a direction away from the underside of the enclosure 100) and the inner surface 230 generally facing inboard in the lateral direction 122 (i.e., towards the opposed side of the enclosure 100). As shown in FIG. 5, the forward skirt panel 202A can define a panel height 232 between its top and bottom ends 224, 226 in the heightwise direction 126 and a panel length 234 between its leading and trailing edges 220, 222 in the lengthwise direction 115. In addition, as shown in FIG. 6, the panel 202A defines a lateral depth 236 between its leading and trailing edges 220, 222 in the lateral direction 122.

The top end 224 of the forward skirt panel 202A can generally be configured to be positioned directly adjacent to the bottom wall 114 of the enclosure 100 when the panel 202A is installed thereon. In such an embodiment, the top end 224 of the forward skirt panel 202A may, for example, be configured to define a planar or straight profile such that the top end 224 can be seated flush or substantially flush against the bottom wall 114 of the enclosure 100. In contrast, the bottom end 226 of the forward skirt panel 202A can be configured to be spaced apart from the bottom wall 114 of the cargo enclosure 100 and can generally correspond to the edge or end of forward skirt panel 202A configured to be positioned closest to the travel surface across which the enclosure 100 is being traversed or towed. As will be described below, given its proximity to the travel surface for the cargo enclosure 100, a portion of the forward skirt panel 202A adjacent to its bottom end 226 can be formed from a different material than the remainder of the panel 202A (e.g., a more resilient or flexible material) to prevent damage to the panel 202A caused by contact with the travel surface or other impediments positioned relative to the travel surface (e.g., speed bumps, etc.).

Additionally, in several embodiments, the forward skirt panel 202A can be configured to define a profile or shape that projects laterally inwardly or inboard (i.e., away from the adjacent side wall/edge 108, 116 and towards the lengthwise centerline 120 of the enclosure 100) as the panel 202A extends in the lengthwise direction 115 from its trailing edge 222 to its leading edge 220. Specifically, as shown in FIG. 6, when installed relative to the adjacent side wall/edge 108, 116 of the cargo enclosure 100 (e.g., as indicated by reference line 108, 116 in FIG. 6), the trailing edge 222 of the panel 202A is configured to be aligned with or positioned immediately inboard of the adjacent side wall/edge 108, 116. However, as the panel 202A extends in the lengthwise direction 115 towards its leading edge 220, the panel 202A curves or extends laterally inboard such that the leading edge 220 of the panel 202A is positioned further inboard (i.e., closer to the lengthwise centerline 120) than the trailing edge 222. For example, as shown in FIG. 6, in one embodiment, the panel 202A can be curved or angled inwardly such that the leading edge 220 of the panel 202A is positioned closer to the lengthwise centerline 120 in the lateral direction 122 than the adjacent side wall/edge 108, 116 of the enclosure 100 (i.e., a lateral distance 238 defined between the leading edge 220 and the lengthwise centerline 120 is less than a lateral distance 240 defined between the leading edge 220 and the adjacent side wall/edge 108, 116).

Moreover, in several embodiments, the panel 202A can define a complex or compound shape or profile in the lateral direction 122 such that the rate at which the lateral depth 236 of the panel 202A changes as it extends in the lengthwise direction 115 from its trailing edge 222 to its leading edge 224 varies along at least a portion of the length 234 of the panel 202A. For example, in the illustrated embodiment, the forward skirt panel 202A has a complex or compound lateral shape or profile defined across first and second lengthwise sections 242, 244 of the panel 202A, with the first lengthwise section 242 extending in the lengthwise direction 115 between the trailing edge 222 and a transition point 246 defined between the first and second lengthwise sections 242, 244, and the second lengthwise section 244 extending in the lengthwise direction 115 between the transition point 246 and the leading edge 220. As shown in FIG. 6, the first lengthwise section 242 defines a lateral profile that differs from the lateral profile of the second lengthwise section 244 such that the rate at which the lateral depth 236 of the panel 202A changes as it extends from the trailing edge 222 to the transition point 246 is relatively small compared to the rate at which the lateral depth 236 changes as the panel 202A further extends from the transition point 246 out to its leading edge 220. Specifically, the first lengthwise section 242 defines a slightly curved or arcuate lateral profile having a relatively large radius of curvature such that the panel 202A gradually transitions inboard towards the lengthwise centerline 120 (and away from the adjacent side wall/edge 108, 116) as it extends from the trailing edge 222 towards the transition point 246. In contrast, the second lengthwise section 244 defines a more linear or straight lateral profile having a shaper inboard angle such that the panel 202A transitions inboard towards the lengthwise centerline 120 (and away from the adjacent side wall/edge 108, 116) at a greater rate as it extends from the transition point 246 towards the leading edge 220. The sharper inboard lateral profile defined by the second lengthwise section 244 can facilitate the generation of a vortex or low pressure area adjacent to the leading edge 220 as an airflow is directed around or across such portion of the panel 202A while the more gradual outboard lateral profile defined by the first lengthwise section 242 can be configured to guide an airflow directed along the outer surface 228 of the panel 202A laterally outboard as it flows towards the trailing edge 222 of the panel 202A.

In several embodiments, the panel 202A can define a tapered or varying heightwise profile along the leading edge 220 of the panel 202A as it extends between the top and bottom ends 224, 226 of the panel 202A. For example, in the illustrated embodiment, the location at which the leading edge 220 intersects the top end 224 of the panel 202A is forward of the location at which the leading edge 220 intersects the bottom end 226 of the panel 200 relative to the forward travel direction 150 of the enclosure 100. As a result, the overall height 232 of the panel 202A defined in the heightwise direction 126 can generally decrease at the leading edge 220 as it extends upwardly towards the top end 224 of the panel 202A. In one embodiment, such tapering of the height 232 of the panel 202A at the leading edge 220 can be constant or linear between the top and bottom ends 224, 226. Alternatively, the degree or rate at which the height 232 tapers along the leading edge 220 can vary between the top and bottom ends 224, 226. For instance, as shown in the embodiment of FIG. 5, the rate at which the height 232 tapers along the leading edge 220 is different along a lower portion of the leading edge 220 as compared to an upper portion of the leading edge 200.

Additionally, in several embodiments, the trailing edge 222 of the panel 202A can define a contoured shape as it extends between the top and bottom ends 224, 226 of the panel 202A. For example, as shown in FIG. 5, the trailing edge 222 has a generally curved or arcuate profile. However, in other embodiments, the trailing edge 222 can define any other suitable shape or profile, such as by extending generally perpendicular between the top and bottom ends 224, 226 of the panel 202A or by configuring the panel 202A to define tapered or varying heightwise profile along the trailing edge 222.

It should be appreciated that, in general, the forward skirt panel 202A can be formed from any suitable material that allows it to function as described herein. For instance, in several embodiments, the forward skirt panel 202A can be formed from a rigid or semi-rigid polymer material. Additionally, in one embodiment, the forward skirt panel 202A can be formed entirely from a single, uniform material as a single piece or multiple pieces connected or otherwise secured together. For example, the forward skirt panel can be formed from a plurality of subpanels connected together. Alternatively, one or more portions of the panel 202A can be formed from differing materials. For example, as indicated above, a portion of the panel 202A adjacent to the bottom end 226 (e.g., the heightwise section indicated at 248) can be formed from a different material than the remainder of the panel 202A, such as by forming such lower portion 248 with a more flexible or resilient material than the material used to form the remainder of the panel 202A.

Figure 7:
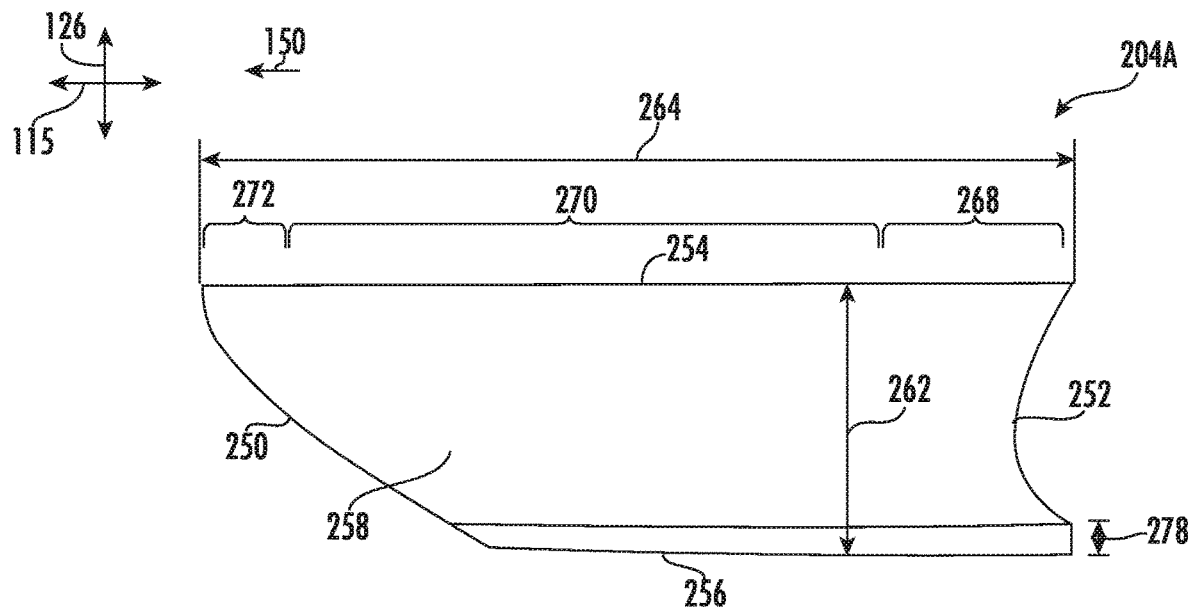
FIGS. 7 and 8 illustrate respective side and bottom views of one of the aft skirt panels of the multi-panel skirt system shown in FIGS. 1-4.
Figure 8:
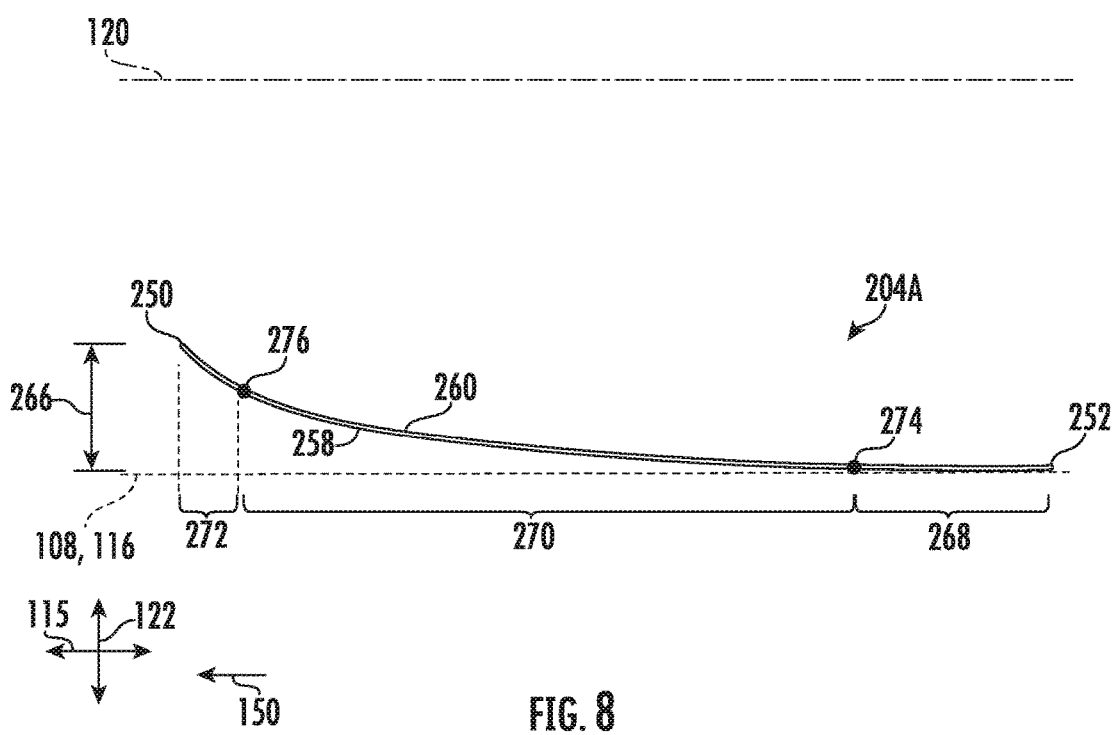

Referring now to FIGS. 7 and 8, differing views of one of the aft skirt panels described above is illustrated in accordance with a preferred embodiment of one or more aspects and features of the invention. Specifically, FIGS. 7 and 8 illustrate respective side and bottom views of the first aft skirt panel 204A shown in FIGS. 1-4, with FIG. 8 depicting first and second dashed reference lines to indicate the locations of the lengthwise centerline 120 and the adjacent side wall/edge 108, 116 of the cargo enclosure 100 relative to the aft skirt panel 204A when the panel 204A is in its installed state. It should be appreciated that the second aft panel 204B can be configured to mirror the first aft panel 204A and can have the same relative positioning to its adjacent side wall/edge 110, 118 of the cargo enclosure 100 as that shown in FIG. 8.

As shown, the aft skirt panel 204A can generally be configured to extend in the lengthwise direction 115 between a leading edge 250 and a trailing edge 252, and in the heightwise direction 126 between a top end 254 and a bottom end 256. The aft skirt panel can also define a laterally outer side or surface 258 and a laterally inner side or surface 260, with the outer surface 258 generally facing outboard in the lateral direction 122 (i.e., in a direction away from the underside of the enclosure 100) and the inner surface 260 generally facing inboard in the lateral direction 122 (i.e., towards the opposed side of the enclosure 100). As shown in FIG. 7, the aft skirt panel 204A can define a panel height 262 between its top and bottom ends 254, 256 in the heightwise direction 126 and a panel length 264 between its leading and trailing edges 250, 252 in the lengthwise direction 115. In addition, as shown in FIG. 8, the panel 204A defines a lateral depth 266 between its leading and trailing edges 250, 252 in the lateral direction 122.

The top end 254 of the aft skirt panel 204A can generally be configured to be positioned directly adjacent to the bottom wall 114 of the enclosure 100 when the panel 204A is installed thereon. In such an embodiment, the top end 254 of the aft skirt panel 204A may, for example, be configured to define a planar or straight profile such that the top end 254 can be seated flush or substantially flush against the bottom wall 114 of the enclosure 100. In contrast, the bottom end 256 of the aft skirt panel 204A can be configured to be spaced apart from the bottom wall 114 of the cargo enclosure 100 and can generally correspond to the edge or end of aft skirt panel 204A configured to be positioned closest to the travel surface across which the enclosure 100 is being traversed or towed. As will be described below, given its proximity to the travel surface for the cargo enclosure 100, a portion of the aft skirt panel 204A adjacent to its bottom end 256 can be formed from a different material than the remainder of the panel 204A (e.g., a more resilient or flexible material) to prevent damage to the panel 204A caused by contact with the travel surface or other impediments positioned relative to the travel surface (e.g., speed bumps, etc.).

Additionally, in several embodiments, the aft skirt panel 204A can be configured to define a profile or shape that projects laterally inwardly or inboard (i.e., away from the adjacent side wall/edge 108, 116 and towards the lengthwise centerline 120 of the enclosure 100) as the panel 204A extends in the lengthwise direction 115 from its trailing edge 252 to its leading edge 250. Specifically, as shown in FIG. 8, when installed relative to the adjacent side wall/edge 108, 116 of the cargo enclosure 100 (e.g., as indicated by reference line 108, 116 in FIG. 8), the trailing edge 252 of the panel 204A is configured to be positioned at or immediately inboard of the adjacent side wall/edge 108, 116. However, as the panel 204A extends in the lengthwise direction 115 towards its leading edge 250, the panel 204A curves or extends laterally inboard such that the leading edge 250 of the panel 204A is positioned further inboard (i.e., closer to the lengthwise centerline 120) than the trailing edge 252.

Moreover, in several embodiments, the aft skirt panel can define a complex or compound shape or profile in the lateral direction 122 such that the rate at which the lateral depth 266 of the panel changes as it extends in the lengthwise direction 115 from its trailing edge 252 to its leading edge 250 varies along at least a portion of the length 264 of the panel 204A. For example, in the illustrated embodiment, the aft skirt panel 204A has complex or compound lateral shape or profile defined across first, second, and third lengthwise sections 268, 270, 272 of the panel 204A, with the first lengthwise section 268 extending in the lengthwise direction 115 between the trailing edge 250 and a first transition point 274 defined between the first and second lengthwise sections 268, 270, the second lengthwise section 270 extending in the lengthwise direction 115 between the first transition point 274 and a second transition point 276 defined between the second and third lengthwise sections 270, 272, and the third lengthwise section 272 extending in the lengthwise direction 115 between the second transition point 276 and the leading edge 250 of the panel 204A. As shown in FIG. 8, the first lengthwise section 268 generally defines a flat or planar lateral profile across which the panel 204A extends generally parallel to the adjacent side wall/edge 108, 116 of the cargo enclosure 100 while the second and third lengthwise sections 270, 272 define laterally inboard extending profiles. Additionally, as shown in the illustrated embodiment, the second lengthwise section 270 defines a lateral profile that differs from the lateral profile of the third lengthwise section 272 such that the rate at which the lateral depth 266 of the panel 204A changes as it extends from the first transition point 274 to the second transition point 276 is relatively small compared to the rate at which the lateral depth 266 changes as the panel 204A further extends from the second transition point 276 out to the leading edge 250. Specifically, the second lengthwise section 270 defines a slightly curved or arcuate lateral profile having a relatively large radius of curvature such that the panel 204A gradually transitions inboard towards the lengthwise centerline 120 (and away from the adjacent side wall/edge 108, 116) as it extends from the first transition point 274 towards the second transition point 276. In contrast, the third lengthwise section 272 defines a more pronounced curved or arcuate lateral profile having a relatively smaller radius of curvature such that the panel 204A transitions inboard towards the lengthwise centerline 120 (and away from the adjacent side wall/edge 108, 116) at a greater rate as it extends from the second transition point 276 towards the leading edge 250 of the panel 204A. The sharper inboard lateral profile defined by the third lengthwise section 272 can facilitate the generation of a vortex or low pressure area adjacent to the leading edge 250 as an airflow is directed around or across such portion of the panel 204A while the more gradual outboard lateral profile defined by the second lengthwise section 270 can be configured to guide an airflow directed along the outer surface 258 of the panel 204A laterally outboard as it flows towards the trailing edge 252 of the panel 204A.

In several embodiments, the panel 204A can define a tapered or varying heightwise profile along the leading edge 250 of the panel 204A as it extends between the top and bottom ends 254, 256 of the panel 204A. For example, in the illustrated embodiment, the location at which the leading edge 250 intersects the top end 254 of the panel 204A is forward of the location at which the leading edge 250 intersects the bottom end 256 of the panel relative to the forward travel direction 150 of the enclosure 100. As a result, the overall height 262 of the panel 204A defined in the heightwise direction 126 can generally decrease at the leading edge 260 as it extends upwardly towards the top end 254 of the panel 204A. In one embodiment, such tapering of the height 262 of the panel 204A at the leading edge 250 can be constant or linear between the top and bottom ends 254, 256. Alternatively, as shown in FIG. 7, the degree or rate at which the height 262 tapers along the leading edge 250 can vary between the top and bottom ends 254, 256.

Additionally, in several embodiments, the trailing edge 252 of the panel 204A can define a contoured shape as it extends between the top and bottom ends 254, 256 of the panel 204A. For example, as shown in FIG. 7, the trailing edge 252 has a generally curved or arcuate profile. In such an embodiment, the curved heightwise profile of the trailing edge 252 may, for instance, be selected so as to provide clearance between the trailing edge 252 of the panel 204A and the wheels 136 of the rear wheel assembly 134. However, in other embodiments, the trailing edge 252 can define any other suitable shape or profile, such as by extending generally perpendicular between the top and bottom ends 254, 256 of the panel 204A or by configuring the panel 204A to define a tapered or varying heightwise profile along the trailing edge 252.

It should be appreciated that, in general, the aft skirt panel 204A can generally be formed from any suitable material that allows it to function as described herein. For instance, in several embodiments, the aft skirt panel 204A can be formed from a rigid or semi-rigid polymer material. Additionally, in one embodiment, the aft skirt panel 204A can be formed entirely from a single, uniform material as a single piece or multiple pieces connected or otherwise secured together. For example, the aft skirt panel can be formed from a plurality of subpanels connected together. Alternatively, one or more portions of the panel 204A can be formed from differing materials. For example, as indicated above, a portion of the panel 204A adjacent to the bottom end 256 (e.g., the heightwise section indicated at 278) can be formed from a differential material than the remainder of the panel 204A, such as by forming such lower portion 278 with a more flexible or resilient material than the material used to form the remainder of the panel 204A.

Figure 9:
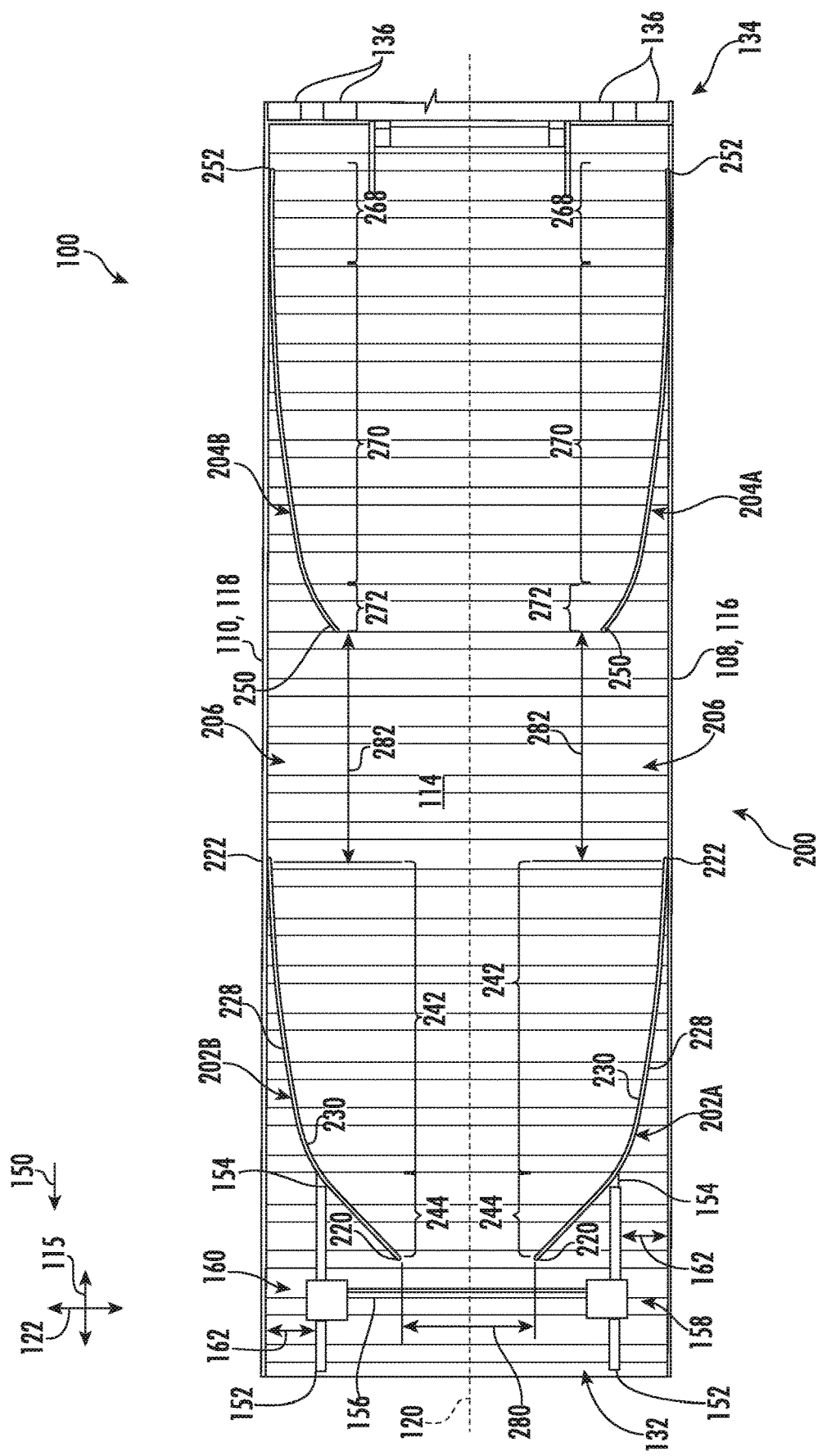
FIG. 9 illustrates a portion of the bottom view of the cargo enclosure shown in FIG. 2, particularly illustrating the positioning of the skirt panels along the bottom side of the enclosure relative to one another and relative to other features of the cargo enclosure.

Referring now to FIG. 9, close-up, bottom view of a portion of the cargo enclosure 100 shown in FIGS. 1-4 is illustrated in accordance with a preferred embodiment of one or more aspects and features of the invention. Specifically, FIG. 9 illustrates a lengthwise portion of the cargo enclosure 100 extending between the landing gear 132 and the rear wheel assembly 134 of the enclosure 100, particularly illustrating the above-described skirt panels installed along the bottom wall 114 of the enclosure 100 between its landing gear 132 and rear wheel assembly 134.

As shown in FIG. 9, the forward skirt panels are configured to be installed along the bottom wall 114 of the cargo enclosure 100 in front or forward of the aft skirt panels relative to the forward travel direction 150 of the enclosure 100. For example, the forward skirt panels can be configured to be installed along the bottom wall 114 such that the leading edges 220 of the forward skirt panels are positioned at or adjacent to the landing gear 132 of the cargo enclosure 100 while the aft skirt panels can be configured to be installed along the bottom wall 114 such that the trailing edges 252 of the aft skirt panels are positioned at or generally adjacent to the rear wheels 136 of the rear wheel assembly 134 of the cargo enclosure 100. Additionally, as shown in FIG. 9, in one embodiment, the forward and aft skirt panels can be spaced apart from one another in the lengthwise direction 115 such that a lengthwise gap 282 is defined between the trailing edge 222 of each forward skirt panel and the leading edge 250 of each adjacent aft skirt panel 204. As indicated above, such lengthwise gap 282 can form an air vent 206 between the adjacent skirt panels. Alternatively, as will be described below with reference to FIGS. 11 and 12, the forward and aft skirt panels can be configured to overlap each other in the lengthwise direction 115 while still defining an air vent therebetween.

Additionally, in several embodiments, the laterally inboard extending profiles of the forward skirt panels can be selected such that a portion of each forward panel overlaps an adjacent portion of the landing gear 132 of the cargo enclosure 100 in the lengthwise direction 115. For example, as shown in FIG. 9, the landing gear 132 extends in the lengthwise direction 115 between a forward end 152 and an aft end 154 and includes a cross-wise structural member 156 extending laterally between opposed first and second lateral sides 158, 160 of the landing gear 132. Additionally, a lateral distance 162 is defined between each lateral side 158, 160 of the landing gear 132 and the adjacent lateral side edge 116, 118 of the cargo enclosure 100. As shown in the illustrated embodiment, the first lengthwise section 242 of each forward skirt panel curves inwardly or inboard from the trailing edge 222 of each panel such that the transition point 246 defined between the first and second lengthwise sections 242, 244 of each panel is generally positioned at or adjacent to the aft end 154 of the landing gear 132 along each of its lateral sides 158, 160. In such an embodiment, the change in the lateral depth 236 of each forward skirt panel across its first lengthwise section 242 is generally equal to the lateral distance 162 defined between each lateral side 158, 160 of the landing gear 132 and the adjacent lateral side edges 116, 118 of the cargo enclosure 100.

Moreover, as shown in FIG. 9, the second lengthwise section 244 of each forward skirt panel extends from the transition point 246 forward of the aft end 154 of the landing gear 132 such that at least a portion of the second lengthwise section 244 of each forward skirt panel is positioned directly between the opposed lateral sides 158, 160 of the landing gear 132 and overlaps portions thereof in the lengthwise direction 115. For example, in the illustrated embodiment, each forward skirt panel extends forward past the aft end 154 of the landing gear 132 such that the leading edge 220 of each panel is positioned generally adjacent to the cross-wise structural member 156 of the landing gear 132. Furthermore, the sharp inboard angles of the second lengthwise sections 244 of the forward skirt panels creates a converging lateral gap 280 directly between the skirt panels as the skirt panels extend in the forward travel direction 150 towards their respective leading edges 220. Such a narrowed lateral gap 280 between the forward skirt panels can serve to reduce the amount of cross-flow that can be directed between the panels from the front side of the enclosure 100. Additionally, the narrowed lateral gap 280 can facilitate guiding any airflow that is directed between the skirt panels in a manner that reduces the overall drag on the cargo enclosure 100 or that allows for such airflow to be expelled from underneath the enclosure 100.

Referring still to FIG. 9, due to the laterally inboard extending profiles of the aft skirt panels 204, the leading edge 250 of each aft skirt panel is positioned inboard of the trailing edge 222 of its adjacent forward skirt panel 202. As will be described below, such relative lateral positioning of the forward and aft skirt panels 202, 24 can facilitate expelling an airflow directed between the forward skirt panels from underneath the cargo enclosure 100. For example, the inwardly curved profile defined by the second and third lengthwise sections 270, 272 of the aft skirt panels can assist in guiding such airflow outboard along the aft skirt panels towards the lateral side edges 116, 118 of the cargo enclosure 100 (and, thus, away from the rear wheel assembly 134).

Figure 10:
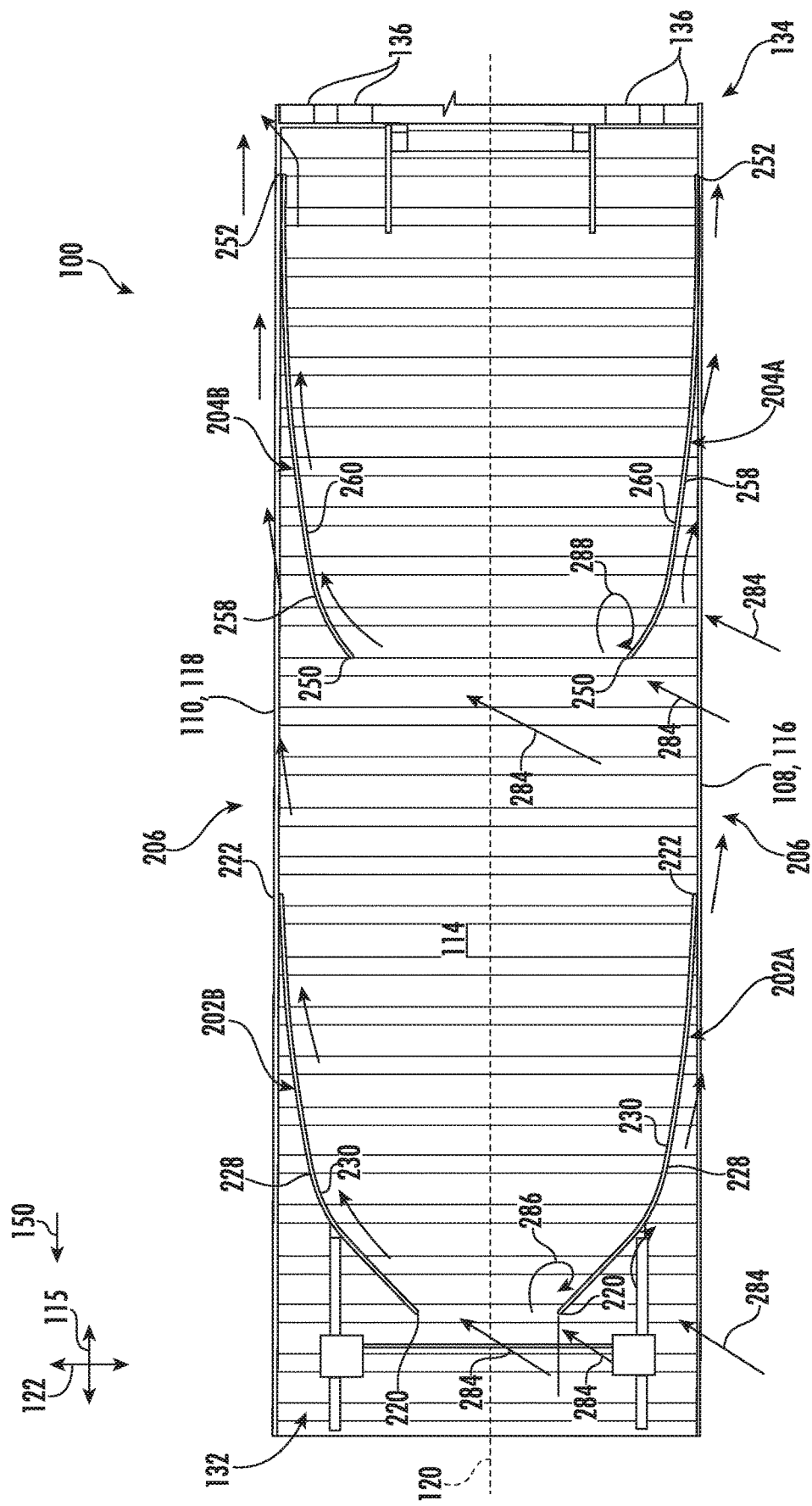
FIG. 10 illustrates the same bottom view of the cargo enclosure as that shown in FIG. 9, particularly illustrating the skirt panels when subjected to a cross-flow across the undercarriage of the enclosure.

Referring now to FIG. 10, another bottom view of the lengthwise section of the cargo enclosure 100 shown in FIG. 9 is illustrated in accordance with a preferred embodiment of one or more aspects and features of the invention, particularly illustrating an example of a cross-flow (as indicated by the arrows 284) relative to the skirt panels when the cargo enclosure 100 is subject to a cross-flow. Specifically, in the illustrated embodiment, the cross-flow 284 is directed across the cargo enclosure 100 in the lateral direction 122 from its first side wall/edge 108, 116 towards its second side wall/edge 110, 118. As a result, for the purposes of describing FIG. 10, the first forward and aft skirt panels 202A, 204A will also be referred to as the upwind forward and aft panels while the second forward and aft skirt panels 202B, 204B will also be referred to as the downwind forward and aft panels. It should be appreciated that, as used herein, the term cross-flow is generally used to refer to an airflow that is directed across the cargo enclosure 100 at a non-zero angle relative to the lengthwise direction 115 of the enclosure 100, such as an angle ranging from 0.5 degrees relative to the lengthwise direction 115 to 20 degrees relative to the lengthwise direction.

As shown in FIG. 10, when a cross-flow 284 is directed towards the cargo enclosure 10, the upwind skirt panels 202A, 204A can be configured to block a significant portion of the airflow 284 from flowing underneath the cargo enclosure 100. Specifically, as the cross-flow 284 contacts the outer surface 228, 258 of each upwind skirt panel 202A, 204A, the contour of each upwind skirt panel 202A, 204A can be configured to guide the flow outboard along the outer surface 228, 258 of the panel 202A, 204A towards its respective trailing edge 222, 252. As a result, such portion of the cross-flow 284 can be prevented from being directed underneath the cargo enclosure 100.

Additionally, as shown in FIG. 10, when the area around the landing gear 132 of the cargo enclosure 100 experiences or is subject to a cross-flow 284, a portion of the cross-flow 284 can be sucked into or can otherwise flow underneath the enclosure 100 and can be subsequently diverted through the lateral gap 280 defined between the forward skirt panels 202A, 202B. In such instance, as the cross-flow 284 is directed past (i.e., around, across, or adjacent to) the leading edge 220 of the upwind forward panel 202A, a vortex 286 can be generated immediately downstream of the leading edge 220 of the upwind forward panel 202A that creates a low pressure area adjacent to the inner surface 230 of such panel 202A, thereby reducing the overall amount of drag on the panel 202A. Specifically, the inwardly curled or angled shape of the second lengthwise section 244 of the upwind forward skirt panel 202A can be adapted to create a spiraling flow as the airflow 284 wraps around the leading edge 220 of the upwind forward panel 202A, thereby increasing the wake downstream of the leading edge 220.

Moreover, as shown in FIG. 10, the profile of the downwind forward panel 202B is configured such that any portion of the cross-flow 284 directed between the forward panels that is not sucked into the vortex 286 generated by the upwind forward panel 202A will be captured along the inner surface 230 of the downwind forward panel 202B and guided along such panel 202B towards is trailing edge 222. Specifically, in the illustrated embodiment, given the inwardly projecting profile of the second lengthwise section 244 of the downwind forward skirt panel 202B, a portion of the cross-flow 284 directed between the forward panels will stick to the inner surface 230 of the downwind forward skirt panel 202B at or adjacent to its leading edge 220 and will subsequently flow along the inner surface 230 to the trailing edge 222 of the panel 202B. At such point, the airflow along the inner surface 230 of the downwind forward skirt panel 202B will be expelled from underneath the cargo enclosure 100 via the air vent 206 defined between the downwind forward and aft skirt panels 202B, 204B. This evacuation of the airflow between the downwind skirt panels 202B, 204B is made possible due, at least in part, to the relative lateral positioning of such panels 202B, 204B. Specifically, as indicated above, the leading edge 250 of the downwind aft panel 204B is positioned inboard of the trailing edge 222 of the downwind forward panel 202B. Thus, as the captured airflow 284 is directed along the inner surface 230 of the downwind forward panel 202B and flows past the trailing edge 222 of such panel 202B, the airflow 284 is subsequently captured by the outer surface 258 of the downwind aft panel 204B and flows outboard along the outer surface 258 of such downstream panel 204B.

It should also be appreciated that, to the extent any portion of the cross-flow 284 is directed from the outside through the air vent 206 defined between the upwind skirt panels 202A, 204A, the aft skirt panels can be configured to function similar to the forward skirt panels when subject to such a cross-flow. For example, the camber or shape of the third lengthwise section 272 of the upwind aft panel 204A can be configured to generate a vortex 288 when an airflow is directed past (i.e., around, across, or adjacent to) the leading edge 250 of the upwind aft panel 204B, thereby creating an area of low pressure immediately downstream of the leading edge 250. In addition, a portion of the cross-flow 284 flowing through the air vent 206 and across the bottom wall 114 of the cargo enclosure 100 will be captured along the inner surface 260 of the downwind aft panel 204B and guided along such surface 260 towards the trailing end 252 of the downwind aft panel 204B. At such point, the airflow flowing along the downwind aft panel 204B can be expelled laterally outwardly through the gap defined between the trailing edge 252 of the downwind aft panel 204B and the rear wheels 136 of the rear wheel assembly 134.

Figure 11:
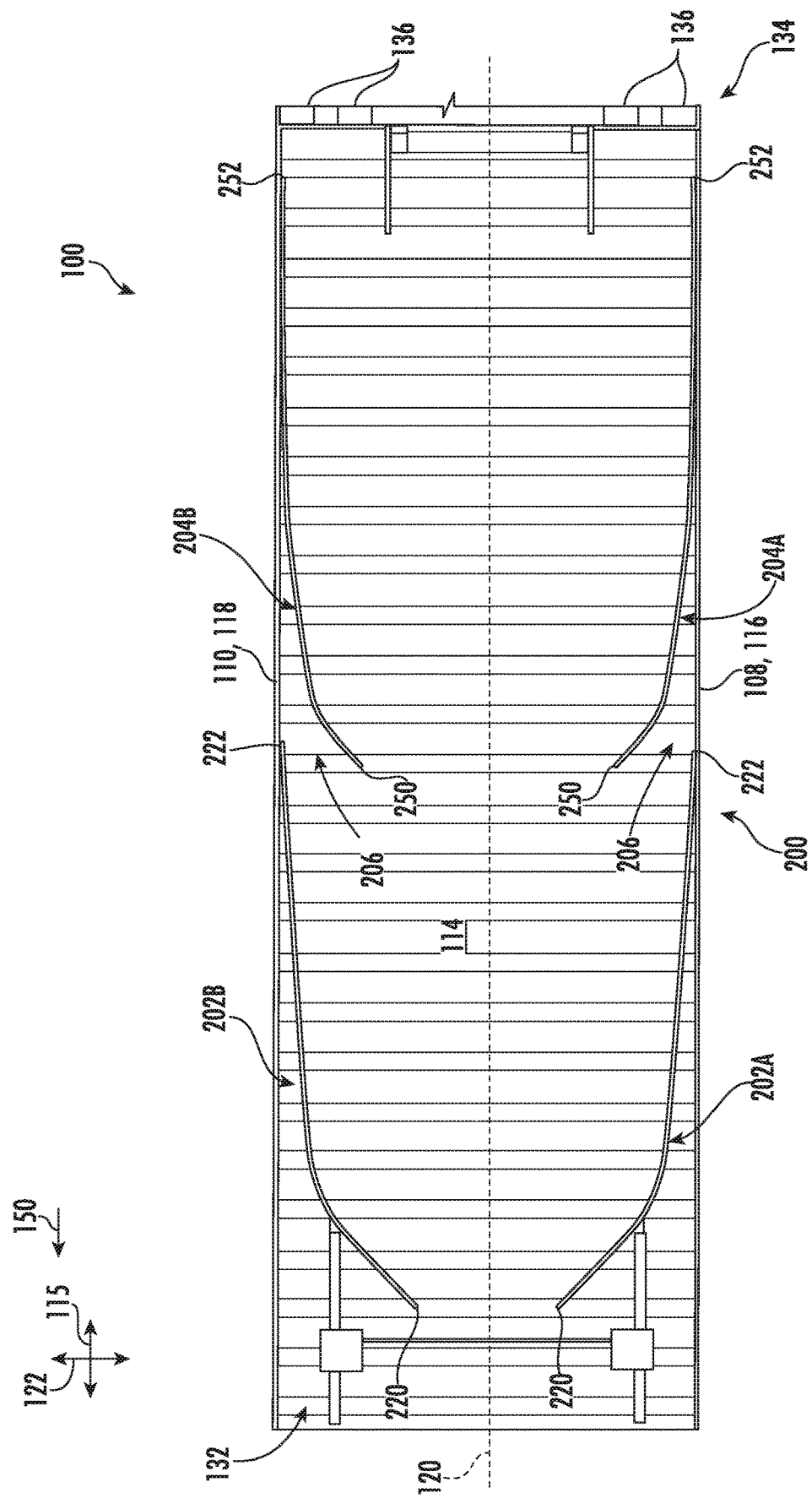
FIG. 11 illustrates a similar bottom view of the cargo enclosure as that shown in FIG. 9, particularly illustrating an alternative embodiment of the disclosed skirt panels in accordance with a preferred embodiment of one or more aspects and features of the invention.

Referring now to FIGS. 11 and 12, differing views of an alternative embodiment of the disclosed multi-panel skirt system 200 are illustrated in accordance with a preferred embodiment of one or more aspects and features of the invention. Specifically, FIG. 11 illustrates a similar bottom view of the cargo enclosure 100 as that shown in FIG. 9 with a variation of the skirt panels installed thereto. Additionally, FIG. 12 illustrates a full side view of the cargo enclosure shown in FIG. 11, particularly illustrating the relative positioning of the alternative embodiment of the skirt panels shown in FIG. 11.

As shown in FIG. 11, the skirt panels are generally configured similarly to that described above with reference to FIGS. 1-10. However, in the illustrated embodiment, the relative lengths of the front skirt panels or the aft skirt panels have been increased such that the forward skirt panels overlap the aft skirt panels in the lengthwise direction 115 of the cargo enclosure 100. Specifically, as shown in FIG. 11, the forward skirt panels are installed relative to the aft skirt panels such that the trailing edge 222 of each forward skirt panel is located aft or behind the leading edge 250 of the adjacent aft skirt panel relative to the forward travel direction 150 of the cargo enclosure 100. As a result, the likelihood of a cross-flow being directed from the outside through the air vent 206 defined between the adjacent panels is significantly reduced or eliminated. Additionally, as shown in FIG. 11, similar to the embodiment described above, the leading edge 250 of each aft skirt panel is located inboard of the trailing edge 222 of the adjacent forward skirt panel 204. As a result, a suitable gap is defined between each pair of adjacent skirt panels for forming the air vent 206, thereby allowing an airflow flowing along the inner surface of the downwind forward skirt panel to be evacuated from underneath the enclosure 100.

Additionally, as shown in FIG. 12, the heightwise profile of the trailing edge 222 of the forward skirt panels has been altered as compared to the embodiment described above with reference to FIG. 5. Specifically, the forward skirt panel defines a tapered heightwise profile along the trailing edge 220 such that the height of the panel decreases as the trailing edge 220 extends upwardly from the bottom end of the panel to the top end of the panel 202.

Based on the foregoing description, it will be readily understood by the Ordinary Artisan that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A cargo enclosure, comprising:
(a) a top wall;
(b) front and rear walls;
(c) first and second side walls extending between the front and rear walls in a lengthwise direction of the cargo enclosure;
(d) a bottom wall extending between the front and rear walls in the lengthwise direction and between the first and second side walls in a lateral direction of the cargo enclosure, the first side wall intersecting the bottom wall at a first lateral side edge of the cargo enclosure, the second side wall intersecting the bottom wall at a second lateral side edge of the cargo enclosure, wherein the top wall, the front and rear walls, the side walls, and the bottom wall enclose a cargo space of the cargo enclosure; and (e) a multi-panel skirt system installed or otherwise secured to the bottom wall, the multi-panel skirt system:
  (i) a first forward skirt panel extending along the bottom wall generally in the lengthwise direction between a leading edge and a trailing edge, the trailing edge of the first forward skirt panel being located adjacent to and aligned with or positioned laterally inboard of the first lateral side edge of the cargo enclosure; and
  (ii) a first aft skirt panel extending along the bottom wall generally in the lengthwise direction between a leading edge and a trailing edge aft of the first forward skirt panel relative to a forward travel direction of the cargo enclosure, the trailing edge of the first aft skirt panel being located adjacent to and aligned with or positioned laterally inboard of the first lateral side edge of the cargo enclosure;
  (iii) wherein the first aft skirt panel extends laterally inboard as the first aft skirt panel extends in the lengthwise direction from its trailing edge to its leading edge such that the leading edge of the first aft skirt panel is positioned laterally inboard of the trailing edge of the first forward skirt panel.

2. The cargo enclosure of claim 1, wherein the leading edge of the first forward skirt panel is positioned further laterally inboard than the trailing edge of the first forward skirt panel.

3. The cargo enclosure of claim 2, wherein the cargo enclosure defines a lengthwise centerline extending in the lengthwise direction that is centered relative to the first and second lateral side edges in the lateral direction, the leading edge of the first forward skirt panel being positioned a lateral distance from the lengthwise centerline that is less than a lateral distance defined between the leading edge of first forward skirt panel and the first lateral side edge of the cargo enclosure.

4. The cargo enclosure of claim 1, wherein the trailing edge of the first forward skirt panel is positioned forward of the leading edge of the first aft skirt panel relative to the forward travel direction for the cargo enclosure such that a lengthwise gap is defined between the first forward and aft skirt panels in the lengthwise direction.

5. The cargo enclosure of claim 1, wherein the trailing edge of the first forward skirt panel is positioned aft of the leading edge of the first aft skirt panel relative to the forward travel direction for the cargo enclosure such that the first aft skirt panel overlaps the first forward skirt panel in the lengthwise direction, and wherein a transverse gap extending between the trailing edge of the first forward skirt panel and the leading edge of the first aft skirt panel defines an air vent.

6. The cargo enclosure of claim 1, wherein the first forward skirt panel defines a compound lateral profile between its leading and trailing edges.

7. The cargo enclosure of claim 6, wherein the first forward skirt panel includes a first lengthwise section and a second lengthwise section, a lateral profile of the first lengthwise section differing from a lateral profile of the second lengthwise section such that the first forward skirt panel extends further inboard along the second lengthwise section than along the first lengthwise section.

8. The cargo enclosure of claim 7, wherein the cargo enclosure includes landing gear installed or otherwise secured to the bottom wall and wherein the first forward skirt panel defines a transition point at which the lateral profile of the first lengthwise section transitions to the lateral profile of the second lengthwise section, the first forward skirt panel being installed relative to the landing gear such that the transition point is located adjacent to an aft end of the landing gear.

9. The cargo enclosure of claim 1, wherein the first aft skirt panel defines a compound lateral profile between its leading and trailing edges.

10. The cargo enclosure of claim 1, wherein the first aft skirt panel includes a first lengthwise section and a second lengthwise section, a lateral profile of the first lengthwise section differing from a lateral profile of the second lengthwise section such that the first aft skirt panel extends further inboard along the second lengthwise section than along the first lengthwise section.

11. The cargo enclosure of claim 1, wherein each of the first forward and aft skirt panels defines a compound lateral profile between its leading and trailing edges.

12. The cargo enclosure of claim 1, further comprising a second forward skirt panel and a second aft skirt panel, the second forward skirt panel extending in the lengthwise direction between a leading edge and a trailing edge and being installed along the bottom wall, the second aft skirt panel extending in the lengthwise direction between a leading edge and a trailing edge and being installed along the bottom wall aft of the second forward skirt panel relative to the forward travel direction of the cargo enclosure.

13. The cargo enclosure of claim 12, wherein a lateral gap is defined between the first and second forward skirt panels in the lateral direction of the cargo enclosure.

14. The cargo enclosure of claim 12, wherein the first and second forward skirt panels create a converging lateral gap therebetween as the first and second forward skirt panels extend in the forward travel direction towards their respective leading edges.

15. The cargo enclosure of claim 14, wherein the first forward skirt panel serves as an upwind forward panel and the second forward skirt panel serves as a downwind forward panel when the cargo enclosure is subjected to a cross-flow directed from its first lateral side edge towards its second lateral side edge, and wherein, when the cross-flow is directed through the lateral gap defined between the first and second forward skirt panels at their leading edges, the leading edge of the upwind forward panel is configured to generate a vortex in association with a first portion of the cross-flow directed through the lateral gap while a second portion of the cross-flow is configured to be captured along an inner surface of the downwind forward panel.

16. The cargo enclosure of claim 15, wherein the second portion of the cross-flow exits from underneath the cargo enclosure via an air vent defined between the downwind forward panel and the second aft skirt panel.

17. The cargo enclosure of claim 12, wherein the trailing edge of the second forward skirt panel is spaced apart from the leading edge of the second aft skirt panel such that an air vent is defined between the second forward and aft skirt panels.

18. The cargo enclosure of claim 12, wherein the multi-panel skit system consists of two pairs of skirt panels, each pair consisting of a forward skirt panel and an aft skirt panel.

19. The cargo enclosure of claim 12, wherein each panel skirt is configured to create vortexes at its leading edge from a cross-wind passing thereby.

20. A cargo enclosure, comprising:
  (a) walls defining a cargo space, including a bottom wall;
  (b) a first forward skirt panel extending along the bottom wall of the cargo enclosure generally in the lengthwise direction of the cargo enclosure between a leading edge and a trailing edge of the first forward skirt panel, with the trailing edge of the first forward skirt panel located adjacent to and aligned with or positioned laterally inboard of a first lateral side edge of the cargo enclosure; and (c) a first aft skirt panel extending along the bottom wall aft of the first forward skirt panel generally in the lengthwise direction between a leading edge and a trailing edge of the first aft skirt panel relative to a forward travel direction of the cargo enclosure, with the trailing edge of the first aft skirt panel being located adjacent to and aligned with or positioned laterally inboard of the first lateral side edge of the cargo enclosure;

(d) wherein the first aft skirt panel extends laterally inboard as the first aft skirt panel extends in the lengthwise direction from its trailing edge to its leading edge such that the leading edge of the first aft skirt panel is positioned laterally inboard of the trailing edge of the first forward skirt panel; and further comprising, (e) a second forward skirt panel extending along the bottom wall of the cargo enclosure generally in the lengthwise direction of the cargo enclosure between a leading edge and a trailing edge of the second forward skirt panel, with the trailing edge of the second forward skirt panel located adjacent to and aligned with or positioned laterally inboard of a second lateral side edge of the cargo enclosure; and (f) a second aft skirt panel extending along the bottom wall aft of the second forward skirt panel generally in the lengthwise direction between a leading edge and a trailing edge of the second aft skirt panel relative to a forward travel direction of the cargo enclosure, with the trailing edge of the second aft skirt panel being located adjacent to and aligned with or positioned laterally inboard of the second lateral side edge of the cargo enclosure;

(g) wherein the second aft skirt panel extends laterally inboard as the second aft skirt panel extends in the lengthwise direction from its trailing edge to its leading edge such that the leading edge of the second aft skirt panel is positioned laterally inboard of the trailing edge of the second forward skirt panel;

(h) wherein the trailing edge of the first forward skirt panel is positioned forward of the leading edge of the first aft skirt panel relative to the forward travel direction for the cargo enclosure such that a lengthwise gap is defined between the first forward and aft skirt panels in the lengthwise direction; and (i) wherein the trailing edge of the first forward skirt panel is positioned aft of the leading edge of the first aft skirt panel relative to the forward travel direction for the cargo enclosure such that the first aft skirt panel overlaps the first forward skirt panel in the lengthwise direction, and wherein a transverse gap extending between the trailing edge of the first forward skirt panel and the leading edge of the first aft skirt panel defines an air vent.

* * * * *